United States Patent Office 3,146,270
Patented Aug. 25, 1964

3,146,270
BIS-3,3,3-TRINITROPROPYL SULFONE
Pliny O. Tawney, Passaic, N.J., assignor to United States Rubber Company, New York, N.Y., a corporation of New Jersey
No Drawing. Filed Nov. 24, 1948, Ser. No. 61,923
1 Claim. (Cl. 260—607)

The invention is a new compound, a bis-trinitropropyl sulfone believed to be the bis-3,3,3-trinitropropyl sulfone.

Although nitro-aliphatic compounds have been proposed for the formulation of explosives, their number and types have been restricted by the lack of a simple method for introducing a multiplicity of nitro groups into the compound and by the frequent instability of the products.

I have now unexpectedly discovered that trinitromethane will react spontaneously with divinyl sulfone to form a bis-trinitropropyl sulfone in high yields. Although this new compound is explosive, under appropriate conditions, it is surprisingly stable to the ordinary mechanical and thermal shocks encountered in handling, packaging and shipping.

The preparation of my new compound is illustrated in the following example. All parts are by weight.

*Example*

Two and four-tenths parts of freshly distilled divinyl sulfone is mixed with an agitated solution of 6.0 parts of trinitromethane in 7.9 parts of methanol. The reaction temperature rises spontaneously from 25 to 50° C. within 0.5 hour and the reaction mixture deposits a large amount of crystalline solid. The latter is removed by filtration and upon drying amounts to 6.5 parts of the bis-trinitropropyl sulfone, m. 152–3° C. (uncorr.).

Analysis:

|  | Percent C | Percent H | Percent N |
|---|---|---|---|
| Theory | 17.15 | 1.92 | 20.01 |
| Found | 17.26 | 1.67 | 19.56 |

This new compound is stable at its melting point but it can be detonated by a heavy hammer blow. It burns with extreme rapidity.

I claim:
Bis-3,3,3-trinitropropyl sulfone.

References Cited in the file of this patent

UNITED STATES PATENTS 2,447,974     Buckley _____ Aug. 24, 1948